(12) United States Patent
Ko et al.

(10) Patent No.: US 8,009,780 B2
(45) Date of Patent: Aug. 30, 2011

(54) APPARATUS AND METHOD FOR GENERATING EFFECTIVE SIGNAL TO NOISE RATIO (SNR) PER STREAM IN MULTIPLE-INPUT MULTIPLE-OUTPUT (MIMO) WIRELESS COMMUNICATION SYSTEM

(75) Inventors: Eun-Seok Ko, Seongnam-si (KR); Tak-Ki Yu, Yongin-si (KR); Yung-Soo Kim, Seongnam-si (KR); Myeon-Kyun Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 649 days.

(21) Appl. No.: 12/217,868

(22) Filed: Jul. 9, 2008

(65) Prior Publication Data

US 2009/0016457 A1    Jan. 15, 2009

(30) Foreign Application Priority Data

Jul. 9, 2007    (KR) .............................. 2007-0068786

(51) Int. Cl.
| | |
|---|---|
| H03D 1/04 | (2006.01) |
| H03D 1/06 | (2006.01) |
| H03K 5/01 | (2006.01) |
| H03K 6/04 | (2006.01) |
| H04B 1/10 | (2006.01) |
| H04L 1/00 | (2006.01) |
| H04L 25/08 | (2006.01) |

(52) U.S. Cl. ........ 375/346; 375/260; 375/347; 375/349; 375/221; 375/261; 455/226.3; 455/296

(58) Field of Classification Search .................. 375/346, 375/260, 347, 349, 340, 285, 284, 267, 261, 375/227; 455/501, 63.1, 226.3, 296
See application file for complete search history.

(56) References Cited

U.S. PATENT DOCUMENTS

| | | | | |
|---|---|---|---|---|
| 6,490,461 | B1* | 12/2002 | Muller | 455/522 |
| 7,110,467 | B2* | 9/2006 | Mitlin et al. | 375/295 |
| 7,826,521 | B1* | 11/2010 | Sun et al. | 375/225 |
| 2002/0056066 | A1* | 5/2002 | Gesbert et al. | 714/759 |
| 2005/0152465 | A1* | 7/2005 | Maltsev et al. | 375/260 |
| 2007/0195893 | A1* | 8/2007 | Kim et al. | 375/240.27 |
| 2009/0003468 | A1* | 1/2009 | Karabulut et al. | 375/260 |

FOREIGN PATENT DOCUMENTS

| | | |
|---|---|---|
| KR | 10-2006-0092400 | 8/2006 |
| KR | 100696208 | 3/2007 |

* cited by examiner

*Primary Examiner* — Phuong Phu

(57) ABSTRACT

A multiple-input multiple-output (MIMO) wireless communication system includes a first calculator for calculating pairwise error rates (PERs) for each modulation scheme combination which comprise elements smaller than or equal to receive antennas in number; a second calculator for calculating symbol error rates (SERs) for the each modulation scheme combination using the PERs; a converter for converting the SERs to effective signal to noise ratios (SNRs); and a determiner for determining one among sets of effective SNR per stream acquired from the modulation scheme combinations, as a final effective SNR per stream.

20 Claims, 4 Drawing Sheets

APPARATUS AND METHOD FOR GENERATING EFFECTIVE SIGNAL TO NOISE RATIO (SNR) PER STREAM IN MULTIPLE-INPUT MULTIPLE-OUTPUT (MIMO) WIRELESS COMMUNICATION SYSTEM

CROSS-REFERENCE TO RELATED APPLICATION(S) AND CLAIM OF PRIORITY

The present application claims the benefit under 35 U.S.C. §119(a) of a Korean patent application filed in the Korean Intellectual Property Office on Jul. 9, 2007 and assigned Serial No. 2007-68786, the entire disclosure of which is hereby incorporated by reference.

TECHNICAL FIELD OF THE INVENTION

The present invention relates generally to a multiple-input multiple-output (MIMO) wireless communication system. More particularly, the present invention relates to an apparatus and a method for generating an effective signal to noise ratio (SNR) per stream for a maximum likelihood (ML) detection in the MIMO wireless communication system.

BACKGROUND OF THE INVENTION

To meet the increasing demands for high-speed and high-quality data transmission, a multiple-input multiple-output (MIMO) wireless communication system using a plurality of transmit antennas and a plurality of receive antennas is attracting much attention. The MIMO technology performs communications using a plurality of streams via the multiple antennas, to thus greatly enhance a channel capacity, compared to a single antenna. For example, when the transmitting end uses M-ary transmit antennas, the receiving end uses M-ary receive antennas, channels between the antennas are independent of each other, and the bandwidth and the entire transmit power are fixed, the average channel capacity increases by M times the single antenna.

There are various detection schemes for detecting an intended signal from signals received on the receive antennas in the MIMO system. Among the various detection schemes, a maximum likelihood (ML) detection exhibits the highest performance. While a linear scheme such as minimum mean square error (MMSE) detection provides a diversity gain less than the number of the receive antennas, the ML detection guarantees the diversity gain as many as the number of the receive antennas. However, too high operational complexity of the ML detection complicates its applications in spite of the optimum performance.

Recently, researches have been conducted to lower the operational complexity with the performance close to the ML detection. As a result, various approaches such as QR decomposition-modified maximum likelihood detector (QRM-MLD), recursive modified maximum likelihood (RMML), and sorted-RMML (S-RMML) are suggested. Those approaches pertain to the MIMO technology of the open loop (OL). That is, the above-mentioned approaches do not consider how to utilize feedback information of the receiving end and how to generate the feedback information. To apply the ML detection to the MIMO technology of the closed loop (CL), what is needed is a method for generating the feedback information suitable for the ML detection.

SUMMARY OF THE INVENTION

To address the above-discussed deficiencies of the prior art, it is a primary aspect of the present invention to address at least the above mentioned problems and/or disadvantages and to provide at least the advantages described below. Accordingly, an aspect of the present invention is to provide an apparatus and a method for generating feedback information for a maximum likelihood (ML) detection in a multiple-input multiple-output (MIMO) wireless communication system.

Another aspect of the present invention is to provide an apparatus and a method for generating an effective signal to noise ratio (SNR) per stream for an ML detection in a MIMO wireless communication system.

Yet another aspect of the present invention is to provide an apparatus and a method for determining a modulation and coding scheme (MCS) level per stream for an ML detection in a MIMO wireless communication system.

The above aspects are achieved by providing a receiving end in a MIMO wireless communication system. The receiving end includes a first calculator for calculating pairwise error rates (PERs) for each modulation scheme combination which comprise elements smaller than or equal to receive antennas in number; a second calculator for calculating symbol error rates (SERs) for each modulation scheme combination using the PERs; a converter for converting the SERs to effective signal to noise ratios (SNRs); and a determiner for determining one among sets of effective SNR per stream acquired from the modulation scheme combinations, as a final effective SNR per stream.

According to one aspect of the present invention, an operating method of a receiving end in a MIMO wireless communication system includes calculating pairwise error rates (PERs) for each modulation scheme combination which comprise elements smaller than or equal to receive antennas in number; calculating symbol error rates (SERs) for each modulation scheme combination using the PERs; converting the SERs to effective signal to noise ratios (SNRs); and determining one among sets of effective SNR per stream acquired from the modulation scheme combinations, as a final effective SNR per stream.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior uses, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
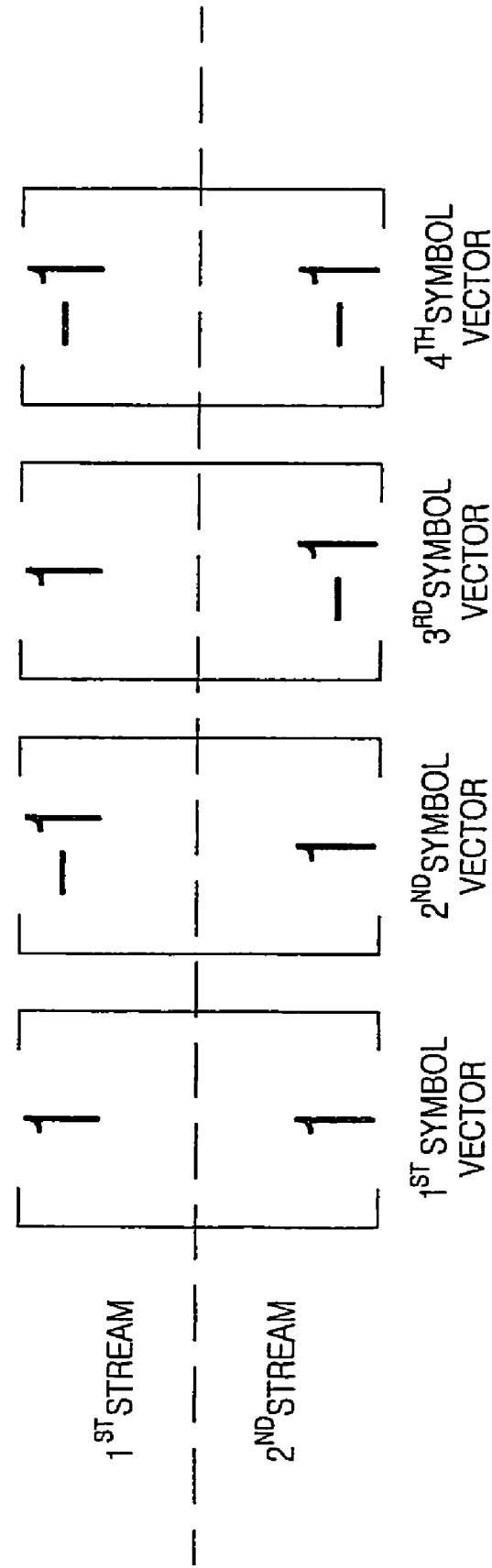
FIG. 1 is a diagram of a transmit symbol combination in a MIMO wireless communication system.

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention provides a technique for generating an effective signal to noise ratio (SNR) per stream for a maximum likelihood (ML) detection in a multiple-input multiple-output (MIMO) wireless communication system.

The technique for generating the effective SNR per stream is illustrated by referring to equations.

It is assumed that a transmitting end includes $N_T$-ary transmit antennas and a receiving end includes $N_R$-ary receive antennas. $N_{T,\mathit{eff}}$ denotes the number of effective streams actually used among transmittable $N_T$-ary streams, and $N_{T,\mathit{eff}}$ is smaller than or equal to $N_T$. s denotes a symbol vector with the magnitude $N_{T,\mathit{eff}} \times 1$ carried by the $N_{T,\mathit{eff}}$-ary streams. $M_{TX}(m)$ denotes a modulation order of the m-th element of the symbol vector s. Herein, $M_{TX}(m)$ is determined by the effective SNR per stream.

The relation between the transmit signal of the transmitting end and the receive signal of the receiving end is expressed as Equation 1:

$$r = W_R H W_T P_T s + n = H_{\mathit{eff}} s + n.$$ [Eqn. 1]

In Equation 1, r denotes a receive symbol vector, $W_R$ denotes a receive weight matrix, H denotes a channel matrix, $W_T$ denotes a transmit weight matrix for the precoding or the beamforming, $P_T$ denotes a diagonal matrix for allocating transmit powers, s denotes a transmit symbol vector, n denotes a noise vector, and $H_{\mathit{eff}}$ denotes an effective channel matrix.

A signal detecting operation of the receiving end can be expressed as Equation 2:

$$\hat{s} = \min_{\hat{s} \in S_{set}} \| r - \hat{H}_{\mathit{eff}} \hat{s} \|^2.$$ [Eqn. 2]

In Equation 2, $\hat{s}$ denotes an estimated transmit symbol vector, $S_{set}$ denotes a transmittable symbol vector set, r denotes the receive symbol vector, $\hat{H}_{\mathit{eff}}$ denotes an estimated effective channel matrix, and $\|\cdot\|^2$ is a vector 2-norm operator.

The transmittable symbol vector set is determined by the modulation order per stream. For example, when $N_{T,\mathit{eff}}$ is 2 and $M_{TX}(1)$ and $M_{TX}(2)$ are binary phase shift keying (BPSK), $S_{set}$ is $\{[1,1]^T, [1,-1]^T, [-1,1]^T, [-1,-1]^T\}$. One of the elements of $S_{set}$ is set to a final transmit symbol vector based on Equation 2. As expressed in Equation 2, the ML detection detects the symbols by regarding the symbol vector as one unit, rather than detecting the symbol per stream.

According to this property of the ML detection, a pairwise error rate (PER) is calculated and then a symbol error rate (SER) per stream is calculated based on the PER. Herein, the PER indicates the error rate of the symbol vector and the SER indicates the error rate of symbol on a stream.

Hereafter, $M_{set}$ denotes a modulation order set and L denotes the number of elements of $M_{set}$. For example, when the available modulation scheme includes BPSK and quadrature phase shift keying (QPSK) and $N_{T,\mathit{eff}}$ is 2, $M_{set}$ is {[BPSK,BPSK], [BPSK,QPSK], [QPSK,BPSK], [QPSK,QPSK]} and L is 4.

$S_{set}(M_{set}(l))$ denotes a transmit symbol vector set according to the l-th element $M_{set}(l)$ of the modulation order set, and $\hat{s}_{l,i}$ denotes the i-th element of $S_{set}(M_{set}(l))$. For example, when the available modulation scheme includes BPSK and QPSK and $N_{T,\mathit{eff}}$ is 2, $M_{set}$ is {[BPSK,BPSK], [BPSK,QPSK], [QPSK,BPSK], [QPSK,QPSK]}. $M_{set}(1)$ is [BPSK,BPSK], $M_{set}(2)$ is [BPSK,QPSK], $M_{set}(3)$ is [QPSK,BPSK], and $M_{set}(4)$ is [QPSK,QPSK]. $S_{set}(M_{set}(1))$ is $\{[1,1]^T, [1,-1]^T, [-1,1]^T, [-1,-1]^T\}$. $\hat{s}_{l,1}$ is $[1,1]^T$, $\hat{s}_{l,2}$ is $[1,-1]^T$, $\hat{s}_{l,3}$ is $[-1,1]^T$, and $\hat{s}_{l,4}$ is $[-1,-1]^T$. As such, every transmittable symbol vector set is determined with respect to every modulation scheme.

Using the above-mentioned variables, the PER between all the transmittable $\hat{s}_{l,i}$ s is expressed as Equation 3:

$$P(\hat{s}_{l,i} \to \hat{s}_{l,j} \mid \hat{H}_{\mathit{eff}}) = Q\left(\sqrt{\frac{E_s}{2\sigma_n^2} d_{ij}^2(l \mid \hat{H}_{\mathit{eff}})}\right), 1 \le l \le L.$$ [Eqn. 3]

In Equation 3, $P(\hat{s}_{l,i} \to \hat{s}_{l,j} \mid \hat{H}_{\mathit{eff}})$ denotes a probability of misjudging $\hat{s}_{l,i}$ as $\hat{s}_{l,j}$ when the effective channel matrix is $\hat{H}_{\mathit{eff}}$, $Q(\cdot)$ denotes a Gaussian Q function, $E_s$ denotes a sum of the transmit powers of the streams, $\sigma_n^2$ denotes a noise power, and $d_{ij}^2(l \mid \hat{H}_{\mathit{eff}})$ denotes an effective distance of $\hat{s}_{l,i}$ and $\hat{s}_{l,j}$. $d_{ij}^2(l \mid \hat{H}_{\mathit{eff}})$ denotes an distance between two transmit symbol vectors multiplied by the effective channel matrix in a constellation; that is, a distance between the two receive symbol vectors passing through the effective channel matrix in the constellation. $d_{ij}^2(l \mid \hat{H}_{\mathit{eff}})$ is defined as $\|\hat{H}_{\mathit{eff}}(\hat{s}_{l,i} - \hat{s}_{l,j})\|_F^2$.

Based on Equation 3, the PER is calculated for the instantaneous effective channel matrix $\hat{H}_{\mathit{eff}}$. However, since the PER represents error information of the symbol vector, it does not represent the symbol error information per stream. For example, the symbol error occurs in the first stream only in two cases out of the three cases of the pairwise error in the first symbol vector as shown in FIG. 1. That is, the pairwise error occurrence does not include the symbol error occurrence of a specific stream. Hence, the present invention calculates the SER per stream using the PER based on Equation 3. A union bound of the SER is calculated based on Equation 4:

$$P_{s,l}(m \mid \hat{H}_{\mathit{eff}}) \le$$ [Eqn. 4]

$$\sum_i P(\hat{s}_{l,i}) \sum_{i \ne j} k_m(\hat{s}_{l,i}, \hat{s}_{l,j}) P(\hat{s}_{l,i} \to \hat{s}_{l,j} \mid \hat{H}_{\mathit{eff}}) + f_m(e, \hat{H}_{\mathit{eff}}),$$

$$1 \le l \le L, 1 \le m \le N_{T,\mathit{eff}}$$

In Equation 4, $P_{s,l}(m \mid \hat{H}_{\mathit{eff}})$ denotes the SER of the m-th stream of $M_{set}(l)$ when the effective channel matrix is $\hat{H}_{\mathit{eff}}$, $P(\hat{s}_{l,i})$ denotes a probability of transmitting $\hat{s}_{l,i}$, $k_m(\hat{s}_{l,i}, \hat{s}_{l,j})$ denotes a variable indicating whether the symbols of the m-th stream in $\hat{s}_{l,i}$ and $\hat{s}_{l,j}$ are different or not, $P(\hat{s}_{l,i} \to \hat{s}_{l,j} | \hat{H}_{\mathit{eff}})$ denotes the probability of misjudging $\hat{s}_{l,i}$ as $\hat{s}_{l,j}$ when the effective channel matrix is $\hat{H}_{\mathit{eff}}$, and $f_m(e, \hat{H}_{\mathit{eff}})$ denotes a compensation value of the error component of the m-th stream according to the estimation error of the effective channel matrix.

Specifically, provided that $N_{T,\mathit{eff}}$ is 2 as shown in FIG. 1, the modulation scheme is (BPSK,BPSK), $f_m(e, \hat{H}_{\mathit{eff}})$ for every m is zero, and $P(\hat{s}_{l,i})$ is constant for every i, $k_m(\hat{s}_{l,i}, \hat{s}_{l,j})$ for every m, every i, and every j is expressed as Equation 5:

$$k_1(\hat{s}_{l,1}, \hat{s}_{l,2}) = 1, \; k_1(\hat{s}_{l,1}, \hat{s}_{l,3}) = 0$$

$$k_1(\hat{s}_{l,1}, \hat{s}_{l,4}) = 1, \; k_1(\hat{s}_{l,2}, \hat{s}_{l,3}) = 1$$

$$k_1(\hat{s}_{l,2}, \hat{s}_{l,4}) = 0, \; k_1(\hat{s}_{l,3}, \hat{s}_{l,4}) = 1$$

$$k_2(\hat{s}_{l,1}, \hat{s}_{l,2}) = 0, \; k_2(\hat{s}_{l,1}, \hat{s}_{l,3}) = 1$$

$$k_2(\hat{s}_{l,1}, \hat{s}_{l,4}) = 1, \; k_2(\hat{s}_{l,2}, \hat{s}_{l,3}) = 1$$

$$k_2(\hat{s}_{l,2}, \hat{s}_{l,4}) = 1, \; k_2(\hat{s}_{l,3}, \hat{s}_{l,4}) = 0. \qquad \text{[Eqn. 5]}$$

$k_m(\hat{s}_{l,i}, \hat{s}_{l,j})$ denotes a variable indicating whether the symbols of the m-th stream in $\hat{s}_{l,i}$ and $\hat{s}_{l,j}$ are different or not.

Equation 6 is obtained by substituting Equation 5 to Equation 4:

$$P_{l,s}(1 | \hat{H}_{\mathit{eff}}) \leq \frac{1}{4} \sum_i \sum_{i \neq j} k_m(\hat{s}_{l,i}, \hat{s}_{l,j}) P(\hat{s}_{l,i} \to \hat{s}_{l,j} | \hat{H}_{\mathit{eff}}) = \qquad \text{[Eqn. 6]}$$

$$\frac{1}{4}(P(\hat{s}_{l,1} \to \hat{s}_{l,2} | \hat{H}_{\mathit{eff}}) + P(\hat{s}_{l,1} \to \hat{s}_{l,4} | \hat{H}_{\mathit{eff}}) +$$

$$P(\hat{s}_{l,2} \to \hat{s}_{l,1} | \hat{H}_{\mathit{eff}}) + P(\hat{s}_{l,2} \to \hat{s}_{l,3} | \hat{H}_{\mathit{eff}}) +$$

$$P(\hat{s}_{l,3} \to \hat{s}_{l,2} | \hat{H}_{\mathit{eff}}) + P(\hat{s}_{l,3} \to \hat{s}_{l,4} | \hat{H}_{\mathit{eff}}) +$$

$$P(\hat{s}_{l,4} \to \hat{s}_{l,1} | \hat{H}_{\mathit{eff}}) + P(\hat{s}_{l,4} \to \hat{s}_{l,3} | \hat{H}_{\mathit{eff}})) =$$

$$\frac{1}{2}(P(\hat{s}_{l,1} \to \hat{s}_{l,2} | \hat{H}_{\mathit{eff}}) + P(\hat{s}_{l,1} \to \hat{s}_{l,4} | \hat{H}_{\mathit{eff}}) + P(\hat{s}_{l,2} \to$$

$$\hat{s}_{l,3} | \hat{H}_{\mathit{eff}}) + P(\hat{s}_{l,3} \to \hat{s}_{l,4} | \hat{H}_{\mathit{eff}})) P_{l,s}(2 | \hat{H}_{\mathit{eff}}) \leq =$$

$$\frac{1}{2}(P(\hat{s}_{l,1} \to \hat{s}_{l,2} | \hat{H}_{\mathit{eff}}) + P(\hat{s}_{l,1} \to \hat{s}_{l,4} | \hat{H}_{\mathit{eff}}) +$$

$$P(\hat{s}_{l,2} \to \hat{s}_{l,3} | \hat{H}_{\mathit{eff}}) + P(\hat{s}_{l,3} \to \hat{s}_{l,4} | \hat{H}_{\mathit{eff}}))$$

In Equation 6, $P_{s,l}(m | \hat{H}_{\mathit{eff}})$ denotes the SER of the m-th stream when the effective channel matrix is $\hat{H}_{\mathit{eff}}$, and $P(\hat{s}_{l,i} \to \hat{s}_{l,j} | \hat{H}_{\mathit{eff}})$ denotes the probability of misjudging $\hat{s}_{l,i}$ as $\hat{s}_{l,j}$ when the effective channel matrix is $\hat{H}_{\mathit{eff}}$.

Based on Equation 6, the SER per stream is calculated using the PER.

Mostly, when $\hat{H}_{\mathit{eff}}$ is given and the SNR is determined, the instantaneous SER is calculated by applying the SNR to the SER of the Gaussian channel according to the modulation schemes. That is, the instantaneous SNR generated for the given channel is equal to the SNR of the Gaussian channel. Hence, the present invention generates the effective SNR per stream by reversing the above operation. Although the instantaneous SER per stream in the ML detection is calculated based on Equation 6, the effective SNR per stream is not generated directly.

Expressions for computing the SER of the Gaussian channel according to the modulation schemes are well known and presented as Equation 7 using the inverse function which takes the SNR as the result value according to the modulation schemes:

$$SNR_{BPSK} = \frac{1}{2}\{Q^{-1}(P_{BPSK})\}^2 \qquad \text{[Eqn. 7]}$$

$$SNR_{MPSK} \approx \frac{1}{2}\left\{\frac{1}{\sin\left(\frac{\pi}{M}\right)} Q^{-1}\left(\frac{P_{MPSK}}{2}\right)\right\}^2$$

$$SNR_{MQAM} \approx \frac{M-1}{3}\left\{Q^{-1}\left(\frac{1 - \sqrt{1 - P_{MQAM}}}{2\left(1 - \frac{1}{\sqrt{M}}\right)}\right)\right\}^2.$$

In Equation 7, $SNR_{(mod)}$ denotes the SNR of the corresponding modulation scheme, $P_{(mod)}$ denotes the SER of the corresponding modulation scheme, $Q^{-1}(\cdot)$ is the inverse function of the Gaussian Q function, and M denotes the modulation order.

By substituting the SER acquired from Equation 4 to Equation 7, the effective SNR of the m-th stream of $M_{set}(l)$ is generated, which is expressed as Equation 8:

$$SNR_{\mathit{eff},l}^{ML}(m) = SER^{-1}(P_{s,l}(m|\hat{H}_{\mathit{eff}}), M_{set}(l,m)) + g_m(e, \hat{H}_{\mathit{eff}}). \qquad \text{[Eqn. 8]}$$

In Equation 8, $SNR_{\mathit{eff},l}^{ML}(m)$ denotes the effective SNR of the m-th stream when the modulation scheme is $M_{set}(l)$, $SER^{-1}(P_{s,l}(m|\hat{H}_{\mathit{eff}}), M_{set}(l,m))$ denotes the SER inverse function corresponding to the modulation scheme of the m-th stream, $M_{set}(l,m)$ denotes the modulation scheme of the m-th stream of $M_{set}(l)$, and $g_m(e, \hat{H}_{\mathit{eff}})$ denotes the compensation value of the error due to the effective channel matrix estimation error.

Based on Equation 8, the effective SNR per stream is generated. The effective SNR per stream differs depending on the modulation scheme combination of the stream. In other words, the effective SNR differs depending on $M_{set}(l)$. This results from the property of the ML detection which detects in units of the symbol vector. The modulation schemes of the streams affect the effective SNRs. Thus, according to an exemplary embodiment of the present invention, the receiving end generates the effective SNR with respect to every element of $M_{set}(l)$; that is, with respect to every modulation scheme combination, and then selects the most appropriate effective SNR.

The receiving end or the transmitting end determines a modulation and coding scheme (MCS) level which meets quality of service (QoS) given for the selected effective SNR. The MCS level has a required SNR. Namely, the SNR predetermines the available MCS level.

Accordingly, among the effective SNRs corresponding to each modulation scheme combination, the effective SNR not meeting the required SNR of the corresponding modulation scheme cannot be selected as the final effective SNR. The final effective SNR should be able to maximize the data rate of the system. By selecting the effective SNR which meets the two conditions, the receiving end can determine the final effective SNR per stream, given $\hat{H}_{\mathit{eff}}$ and $\sigma_n^2$. At the same time, the modulation scheme combination corresponding to the final effective SNR becomes the MCS level of the receiving end. The final effective SNR per stream is determined based on Equation 9:

$$\max_l \sum_{m=1}^{N_{T,\mathit{eff}}} R(M_{set}(l, m), c(m)) \qquad \text{[Eqn. 9]}$$

$$SNR_{req}(M_{set}(l, m), c(m)) \leq SNR_{\mathit{eff},l}^{ML}(m) \text{ for all } m\text{'s}.$$

In Equation 9, l denotes a modulation scheme combination index, $N_{T,\mathit{eff}}$ denotes the number of the effective SNRs, $M_{set}(l,m)$ denotes the modulation scheme of the m-stream, c(m) denotes the channel code rate of the m-th stream, $R(M_{set}(l,m),c(m))$ denotes the data rate when the modulation scheme of the m-stream is $M_{set}(l,m)$ and the channel code rate is c(m), $SNR_{eff,l}^{ML}(m)$ denotes the effective SNR of the m-th stream when the modulation scheme is $M_{set}(l)$, and $SNR_{req}(M_{set}(l,m),c(m))$ denotes the required SNR to employ the modulation scheme of the m-th stream as $M_{set}(l,m)$ and employ the channel code rate as c(m).

Herein, the data rate $R(M_{set}(l,m),c(m))$ of the m-th stream is calculated in two ways.

The first way is expressed as Equation 10:

$$R(M_{set}(l,m),c(m)) = f_{bits}(M_{set}(l,m)) \times c(m).$$ [Eqn. 10]

$M_{set}(l,m)$ denotes the modulation scheme of the m-th stream, c(m) denotes the channel code rate of the m-th stream, $R(M_{set}(l,m),c(m))$ denotes the data rate when the modulation scheme of the m-th stream is $M_{set}(l,m)$ and the channel code rate is c(m), and $f_{bits}(M_{set}(l,m))$ denotes the function which converts $M_{set}(l,m)$ to bits. For example, $f_{bits}(16QAM)$ is 4.

The second way is expressed as Equation 11:

$$R(M_{set}(l,m),c(m)) = C_{M_{set}(l,m)}(SNR_{eff,l}^{ML}(m)).$$ [Eqn. 11]

$M_{set}(l,m)$ denotes the modulation scheme of the m-th stream, c(m) denotes the channel code rate of the m-th stream, $R(M_{set}(l,m),c(m))$ denotes the data rate when the modulation scheme of the m-th stream is $M_{set}(l,m)$ and the channel code rate is c(m), $SNR_{eff,l}^{ML}(m)$ denotes the effective SNR of the m-th stream, and $C_{M_{set}(l,m)}(SNR_{eff,l}^{ML}(m))$ denotes a channel capacity of the m-th stream.

That is, after computing the data rate based on Equation 10 or Equation 11, the receiving end can determine the effective SNR and the MCS level to meet the QoS and to maximize the data rate based on Equation 9.

Now, the structure and the operations of the receiving end for determining the effective SNR per stream and the MCS level are explained in detail by referring to the drawings.

Figure 2:
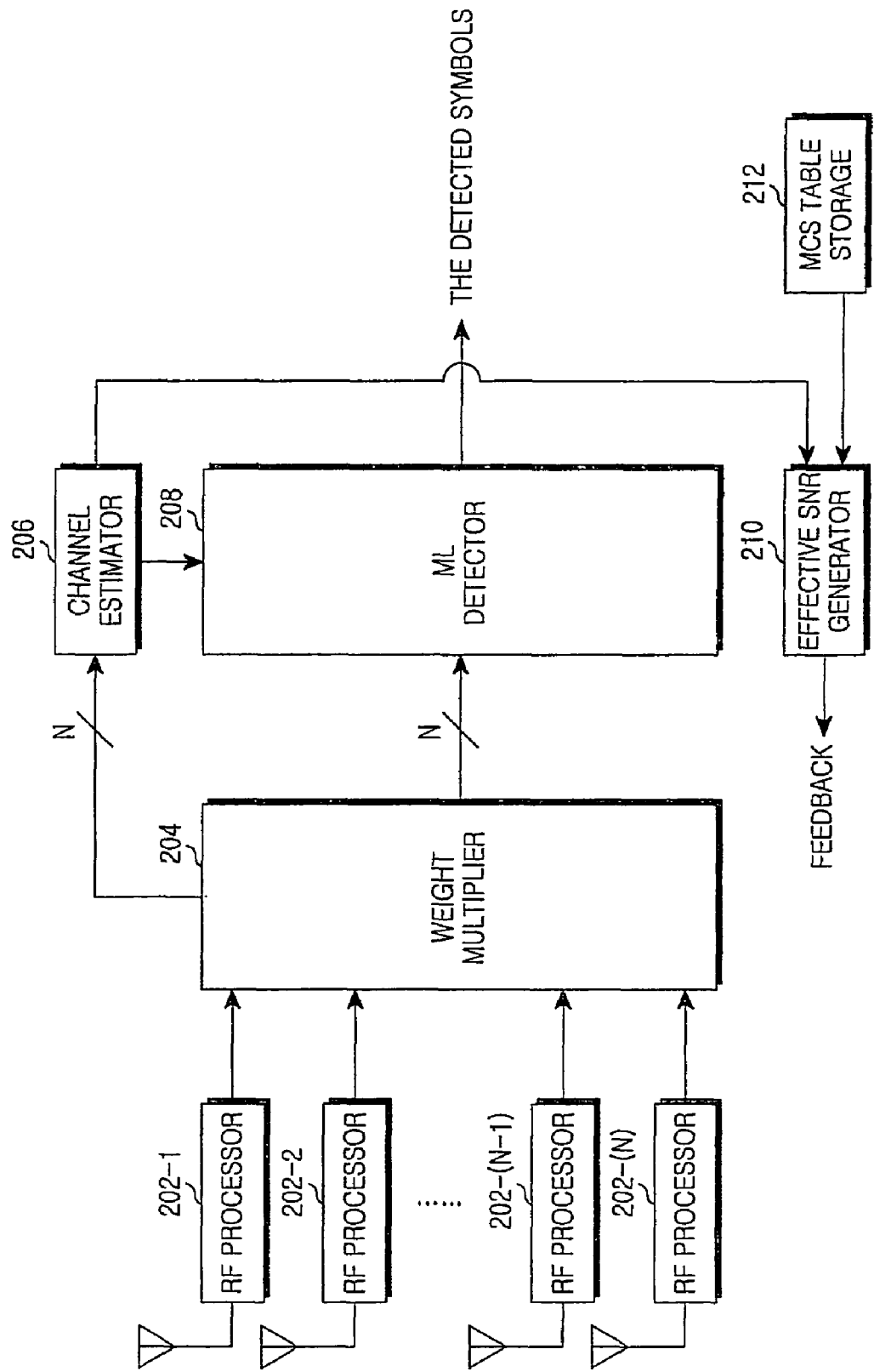
FIG. 2 is a block diagram of a receiving end in a MIMO wireless communication system according to an exemplary embodiment of the present invention.

FIG. 2 is a block diagram of the receiving end in the MIMO wireless communication system according to an exemplary embodiment of the present invention.

The receiving end of FIG. 2 includes a plurality of radio frequency (RF) processors 202-1 through 202-N, a weight multiplier 204, a channel estimator 206, an ML detector 208, an effective SNR generator 210, and an MCS table storage 212.

The RF processors 202-1 through 202-N convert an RF signal received on the corresponding antenna to a baseband signal. The weight multiplier 204 multiplies the receive symbol vector by the weight matrix for the receive beamforming. The channel estimator 206 estimates the channel using a pre-designated receive signal; that is, using a pilot signal. The channel estimator 206 constitutes the effective channel matrix by taking account of the signal processing on the transmit symbol vector in the transmitting end and the signal processing on the receive symbol vector in the receiving end. For example, the effective channel matrix can be acquired by multiplying the transmitter weight matrix, the transmitter power allocation matrix, the channel matrix, and the receiver weight matrix as expressed in Equation 1. The channel estimator 206 calculates and provides the effective channel matrix and the average noise power of the channel to the effective SNR generator 210.

The ML detector 208 estimates the transmit symbol vector from the receive symbol vector using the ML detection. Specifically, the ML detector 208 estimates the transmit symbol vector based on Equation 2. The effective SNR generator 210 generates the effective SNR per stream according to the present invention. The structure and the functions of the effective SNR generator 210 will be described by referring to FIG. 3. The MCS table storage 212 stores a table of the required SNR information based on the MCS level and provides the table to the effective SNR generator 210.

Figure 3:
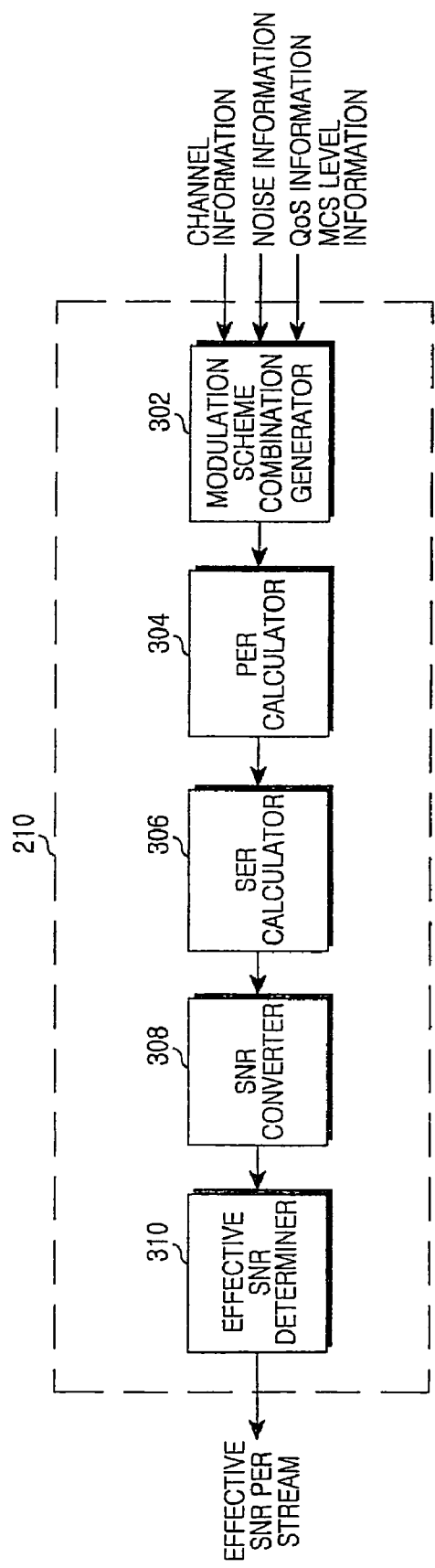
FIG. 3 is a detailed block diagram of an effective SNR generator in the MIMO wireless communication system according to an exemplary embodiment of the present invention.

FIG. 3 is a detailed block diagram of the effective SNR generator 210 in the MIMO wireless communication system according to an exemplary embodiment of the present invention.

The effective SNR generator 210 of FIG. 3 includes a modulation scheme combination generator 302, a PER calculator 304, an SER calculator 306, an SNR converter 308, and an effective SNR determiner 310.

The modulation scheme combination generator 302 generates all possible modulation scheme combinations including the elements as many as the number of the effective streams. For example, when the number of the effective streams is 2 and the available modulation schemes include the BPSK and the QPSK, four modulation scheme combinations [BPSK,BPSK], [BPSK,QPSK], [QPSK,BPSK], [QPSK,QPSK] are generated.

The PER calculator 304 calculates the PER for each modulation scheme combination provided from the modulation scheme combination generator 302. Herein, the PER indicates the symbol vector error rate, and one PER is calculated for each transmit symbol vectors. More specifically, the PER calculator 304 computes the distance between the two transmit symbol vectors multiplied by the effective channel matrix in the constellation, the sum of the transmit powers of the streams, and the square root of the product of the reciprocal of the noise power, and then calculates the PER between the two transmit symbol vectors using the square root and the Gaussian Q function. For example, the PER calculator 304 computes the PER for each of the modulation scheme combinations based on Equation 3.

The SER calculator 306 calculates the SER per stream of each of the modulation scheme combinations using the acquired PERs. Herein, the SER indicates the symbol error rate in one stream. That is, the SER calculator 306 computes the SER of the corresponding stream by summing the PERs of the transmit symbol vector pairs which cause the symbol error in the corresponding stream. For example, the SER calculator 306 calculates the SER per stream for each of the modulation scheme combinations based on Equation 4, Equation 5, and Equation 6.

The SNR converter 308 converts the SER calculated at the SER calculator 306 to the SNR per stream. In other words, the SNR converter 308 generates candidates for the final effective SNR per stream. For example, the SNR converter 308 converts the SER to the SNR based on Equation 7 and Equation 8.

The effective SNR determiner 310 determines the final effective SNR per stream amongst the effective SNRs per stream of the modulation scheme combinations output from the SNR converter 308. The effective SNR determiner 310 sets one of the effective SNRs per stream acquired from each of the modulation scheme combinations to the final effective SNR per stream. Namely, the final effective SNR per stream is selected from the effective SNRs per stream of the modulation scheme combinations output from the SNR converter 308.

The final effective SNR per stream should meet the following conditions. The final effective SNR per stream is an effective SNR per stream which maximizes the data rate of the system, among the candidates meeting the required SNR of the corresponding modulation scheme. For instance, the effective SNR determiner 310 determines the final effective SNR per stream based on Equation 9.

The effective SNR determiner 310 computes the data rate per stream based on Equation 10) or Equation 11.

The effective SNR per stream generated as above is fed back to the transmitting end and used for the transmitting end to schedule and to determine the MCS level of the transmit signal. The MCS level may be directly fed back because the MCS level is determined together when the effective SNR per stream is generated. Accordingly, the receiving end further includes a feedback transmitter (not shown) for sending the feedback information to the transmitting end. The feedback transmitter transmits at least one of the effective SNR per stream information and the MCS level information to the transmitting end.

Figure 4:
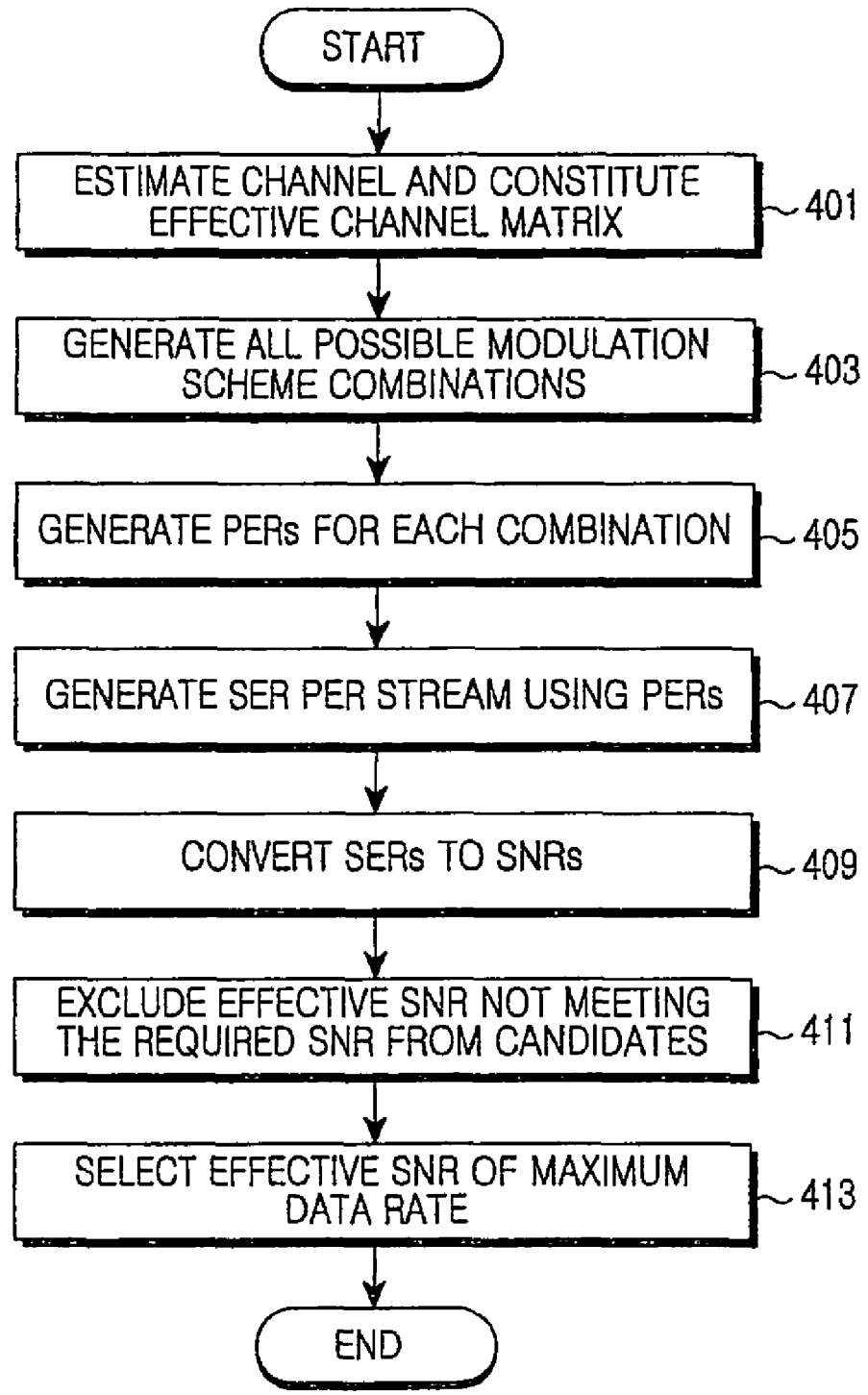
FIG. 4 is a flowchart of a method for determining the effective SNR per stream of a receiving end in the MIMO wireless communication system according to an exemplary embodiment of the present invention.

FIG. 4 is a flowchart of a method for the receiving end to determine the effective SNR per stream in the MIMO wireless communication system according to an exemplary embodiment of the present invention.

In step 401, the receiving end estimates the channel using the pre-designated receive signal and constitutes the effective channel matrix. For instance, the pre-designated signal can be a pilot signal. Herein, the effective channel matrix indicates the channel matrix between the transmit symbol vectors and the receive symbol vectors by considering the signal processing on the transmit symbol vectors in the transmitting end and the signal processing on the receive symbol vectors in the receiving end. For example, the effective channel matrix can be obtained by multiplying the transmitter weight matrix, the transmitter power allocation matrix, the channel matrix, and the receiver weight matrix based on Equation 1.

In step 403, the receiving end generates all the possible modulation scheme combinations including the elements as many as the number of the effective streams. For example, when the number of the effective streams is 2 and the available modulation schemes include the BPSK and the QPSK, four modulation scheme combinations of [BPSK,BPSK], [BPSK,QPSK], [QPSK,BPSK], [QPSK,QPSK] are generated.

In step 405, the receiving end computes the PERs for each of the modulation scheme combinations. Herein, the PER indicates the symbol vector error rate and one PER is calculated between two transmit symbol vectors. The receiving end computes the distance between the two transmit symbol vectors multiplied by the effective channel matrix in the constellation, the sum of the transmit powers of the streams, and the square root of the product of the reciprocal of the noise power, and then calculates the PER between the two transmit symbol vectors using the square root and the Gaussian Q function. For example, the receiving end computes the PER for each of the modulation scheme combinations based on Equation 3.

In step 407, the receiving end calculates the SER per stream for each of the modulation scheme combinations using the PERs. Herein, the SER indicates the symbol error rate in one stream. More specifically, the receiving end calculates the SER of the corresponding stream by summing the PERs of the transmit symbol vector pairs which cause the symbol error in the corresponding stream. For example, the receiving end calculates the SER per stream of each of the modulation scheme combinations based on Equation 4, Equation 5, and Equation 6.

In step 409, the receiving end converts the SERs to the effective SNRs per stream. That is, the receiving end generates the candidates for the final effective SNR per stream. For example, the receiving end converts the SERs to the effective SNRs based on Equation 7 and Equation 8.

In step 411, the receiving end excludes the effective SNR set which does not satisfy the required SNR of the corresponding modulation scheme from the candidates among sets of the effective SNR per stream of the modulation scheme combinations. The required SNR is determined by the MCS level. The relation between the MCS levels and the required SNRs is stored as the table.

In step 413, the receiving end selects the effective SNR set of the maximum data rate as the final effective SNR per stream among the remaining candidates. For example, the receiving end determines the final effective SNR per stream based on Equation 9.

When following Equation 9, the receiving end computes the data rate per stream based on Equation 10 or Equation 11.

The generated effective SNR per stream is fed back to the transmitting end and used for the transmitting end to schedule and to determine the MCS level of the transmit signal. The MCS level may be directly fed back because the MCS level is determined together when the effective SNR per stream is generated. Next, the receiving end transmits at least one of the effective SNR per stream information and the MCS level information to the transmitting end.

In the light of the foregoing, the MIMO wireless communication system determines the effective SNR per stream using the PER and the SER, to thus maximize the performance of the receiving end which performs the ML detection.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A receiving end apparatus in a multiple-input multiple-output (MIMO) wireless communication system, comprising:
a first calculator for calculating a pairwise error rate (PER) for each modulation scheme combination which comprise elements smaller than or equal to receive antennas in number;
a second calculator for calculating a symbol error rate (SER) per stream for the each modulation scheme combination using the pairwise error rates;
a converter for converting symbol error rates to effective signal to noise ratios (SNRs); and
a determiner for determining one among sets of effective signal to noise ratio per stream acquired from the each modulation scheme combination, as a final effective signal to noise ratio per stream.

2. The apparatus of claim 1, wherein the first calculator calculates a distance between two transmit symbol vectors multiplied by an effective channel matrix in a constellation, a sum of transmit powers of streams, and a square root of a product of a reciprocal of a noise power, and calculates a pairwise error rate between the two transmit symbol vectors using the square root and a Gaussian Q function.

3. The apparatus of claim 1, wherein the second calculator calculates the symbol error rate of a stream by summing pairwise error rates of transmit symbol vector pairs which cause a symbol error of the stream.

4. The apparatus of claim 3, wherein the second calculator calculates the symbol error rates based on the following equation:

$$P_{s,l}(m \mid \hat{H}_{eff}) \leq \sum_i P(\hat{s}_{l,i}) \sum_{i \neq j} k_m(\hat{s}_{l,i}, \hat{s}_{l,j}) P(\hat{s}_{l,i} \to \hat{s}_{l,j} \mid \hat{H}_{eff}) + f_m(e, \hat{H}_{eff}),$$

$$1 \leq l \leq L, 1 \leq m \leq N_{T,eff}$$

where $P_{s,l}(m|\hat{H}_{\mathit{eff}})$ denotes a symbol error rate of an m-th stream of $M_{set}(l)$ when the effective channel matrix is $\hat{H}_{\mathit{eff}}$, $P(\hat{s}_{l,i})$ denotes a probability of transmitting $\hat{s}_{l,i}$, $k_m(\hat{s}_{l,i},\hat{s}_{l,j})$ denotes a variable indicating whether symbols of the m-th stream in $\hat{s}_{l,i}$ and $\hat{s}_{l,j}$ are different or not, $P(\hat{s}_{l,i} \rightarrow \hat{s}_{l,j}|\hat{H}_{\mathit{eff}})$ denotes a probability of misjudging $\hat{s}_{l,i}$ as $\hat{s}_{l,j}$ when the effective channel matrix is $\hat{H}_{\mathit{eff}}$, $f_m(e,\hat{H}_{\mathit{eff}})$ denotes a compensation value of an error component of the m-th stream according to an estimation error of the effective channel matrix, and $N_{T,\mathit{eff}}$ denotes a number of effective streams.

5. The apparatus of claim 1, wherein the converter converts the symbol error rates to the effective signal to noise ratios based on the following equation:

$$SNR_{\mathit{eff},l}^{ML}(m) = SER^{-1}(P_{s,l}(m|\hat{H}_{\mathit{eff}}), M_{set}(l,m)) + g_m(e,\hat{H}_{\mathit{eff}})$$

where $SNR_{\mathit{eff},l}^{ML}(m)$ denotes an effective signal to noise ratio of an m-th stream when a modulation scheme is $M_{set}(l)$, $SER^{-1}(P_{s,l}(m|\hat{H}_{\mathit{eff}}), M_{set}(l,m))$ denotes a symbol error rate inverse function corresponding to the modulation scheme of the m-th stream, $M_{set}(l,m)$ denotes the modulation scheme of the m-th stream of $M_{set}(l)$, and $g_m(e,\hat{H}_{\mathit{eff}})$ denotes a compensation value of an error due to an effective channel matrix estimation error.

6. The apparatus of claim 1, wherein the determiner selects one among the sets of the effective signal to noise ratio per stream which meets a required signal to noise ratio of a corresponding modulation scheme.

7. The receiving end of claim 6, wherein the determiner selects one set of the effective signal to noise ratio per stream, the one set having a maximum data rate, which meets the required signal to noise ratio of the corresponding modulation scheme.

8. The apparatus of claim 7, wherein the determiner determines the final effective signal to noise ratio set per stream based on the following equation:

$$\max_l \sum_{m=1}^{N_{T,\mathit{eff}}} R(M_{set}(l,m), c(m))$$

$$SNR_{req}(M_{set}(l,m), c(m)) \leq SNR_{\mathit{eff},l}^{ML}(m) \text{ for all } m\text{'s}$$

where l denotes a modulation scheme combination index, $N_{T,\mathit{eff}}$ denotes a number of effective streams, $M_{set}(l,m)$ denotes a modulation scheme of an m-stream, $c(m)$ denotes a channel code rate of the m-th stream, $R(M_{set}(l,m),c(m))$ denotes a data rate when the modulation scheme of the m-stream is $M_{set}(l,m)$ and a channel code rate is $c(m)$, $SNR_{\mathit{eff},l}^{ML}(m)$ denotes an effective signal to noise ratio of the m-th stream when the modulation scheme is $M_{set}(l)$, and $SNR_{req}(M_{set}(l,m),c(m))$ denotes a required signal to noise ratio to define the modulation scheme of the m-th stream as $M_{set}(l,m)$ and to define the channel code rate as $c(m)$.

9. The apparatus of claim 1, further comprising:
an estimator for estimating a channel to a transmitting end using a receive signal, and constituting an effective channel matrix by taking into account a signal processing on transmit symbol vectors in the transmitting end and a signal processing on receive symbol vectors in the receiving end.

10. The apparatus of claim 1, further comprising:
a transmitter for feeding information of the final effective signal to noise ratio per stream or information of the modulation scheme combination corresponding to the final effective signal to noise ratio per stream, back to the transmitting end.

11. An operating method of a receiving end in a multiple-input multiple-output (MIMO) wireless communication system, the method comprising:
calculating pairwise error rates (PERs) for each modulation scheme combination which comprise elements smaller than or equal to receive antennas in number;
calculating symbol error rates (SERs) for the each modulation scheme combination using the pairwise error rates;
converting the symbol error rates to effective signal to noise ratios (SNRs); and
determining one among sets of effective signal to noise ratio per stream acquired from the each modulation scheme combination, as a final effective signal to noise ratio per stream.

12. The operating method of claim 11, wherein the pairwise error rates each are calculated using a distance between two transmit symbol vectors multiplied by an effective channel matrix in a constellation, a sum of transmit powers of streams, a square root of a product of a reciprocal of a noise power, and a Gaussian Q function.

13. The operating method of claim 11, wherein the symbol error rates per stream each are calculated by summing pairwise error rates of transmit symbol vector pairs which cause a symbol error of the stream.

14. The operating method of claim 13, wherein the symbol error rates each are calculated based on the following equation:

$$P_{s,l}(m|\hat{H}_{\mathit{eff}}) \leq \sum_i P(\hat{s}_{l,i}) \sum_{i \neq j} k_m(\hat{s}_{l,i},\hat{s}_{l,j}) P(\hat{s}_{l,i} \rightarrow \hat{s}_{l,j}|\hat{H}_{\mathit{eff}}) + f_m(e,\hat{H}_{\mathit{eff}}),$$

$$1 \leq l \leq L, \ 1 \leq m \leq N_{T,\mathit{eff}}$$

where $P_{s,l}(m|\hat{H}_{\mathit{eff}})$ denotes an symbol error rate of an m-th stream of $M_{set}(l)$ when the effective channel matrix is $\hat{H}_{\mathit{eff}}$, $P(\hat{s}_{l,i})$ denotes a probability of transmitting $\hat{s}_{l,i}$, $k_m(\hat{s}_{l,i},\hat{s}_{l,j})$ denotes a variable indicating whether symbols of the m-th stream in $\hat{s}_{l,i}$ and $\hat{s}_{l,j}$ are different or not, $P(\hat{s}_{l,i} \rightarrow \hat{s}_{l,j}|\hat{H}_{\mathit{eff}})$ denotes a probability of misjudging $\hat{s}_{l,i}$ as $\hat{s}_{l,j}$ when the effective channel matrix is $\hat{H}_{\mathit{eff}}$, $f_m(e,\hat{H}_{\mathit{eff}})$ denotes a compensation value of an error component of the m-th stream according to an estimation error of the effective channel matrix, and $N_{T,\mathit{eff}}$ denotes a number of effective streams.

15. The operating method of claim 11, wherein the symbol error rates are converted to the effective signal to noise ratios based on the following equation:

$$SNR_{\mathit{eff},l}^{ML}(m) = SER^{-1}(P_{s,l}(m|\hat{H}_{\mathit{eff}}), M_{set}(l,m)) + g_m(e,\hat{H}_{\mathit{eff}})$$

where $SNR_{\mathit{eff},l}^{ML}(m)$ denotes an effective signal to noise ratio of an m-th stream when a modulation scheme is $M_{set}(l)$, $SER^{-1}(P_{s,l}(m|\hat{H}_{\mathit{eff}}), M_{set}(l,m))$ denotes a symbol error rate inverse function corresponding to the modulation scheme of the m-th stream, $M_{set}(l,m)$ denotes the modulation scheme of the m-th stream of $M_{set}(l)$, and $g_m(e,\hat{H}_{\mathit{eff}})$ denotes a compensation value of an error due to an effective channel matrix estimation error.

16. The operating method of claim 11, wherein the final effective signal to noise ratio per stream is one among the sets of the effective signal to noise ratio per stream which meets a required signal to noise ratio of a corresponding modulation scheme.

17. The operating method of claim 16, wherein the final effective signal to noise ratio per stream is one set of effective signal to noise ratio per stream, the one set having a maximum data rate, which meets the required signal to noise ratio of the corresponding modulation scheme.

18. The operating method of claim 17, wherein the final effective signal to noise ratio set per stream is determined based on the following equation:

$$\max_{l} \sum_{m=1}^{N_{T,\mathit{eff}}} R(M_{set}(l,m), c(m))$$

$$SNR_{req}(M_{set}(l,m), c(m)) \leq SNR_{\mathit{eff},l}^{ML}(m) \text{ for all } m\text{'s}$$

where l denotes a modulation scheme combination index, $N_{T,\mathit{eff}}$ denotes a number of effective streams, $M_{set}(l,m)$ denotes a modulation scheme of an m-stream, c(m) denotes a channel code rate of the m-th stream, $R(M_{set}(l,m),c(m))$ denotes a data rate when the modulation scheme of the m-stream is $M_{set}(l,m)$ and a channel code rate is c(m), $SNR_{\mathit{eff},l}^{ML}(m)$ denotes an effective signal to noise ratio of the m-th stream when the modulation scheme is $M_{set}(l)$, and $SNR_{req}(M_{set}(l,m),c(m))$ denotes a required signal to noise ratio to define the modulation scheme of the m-th stream as $M_{set}(l,m)$ and to define the channel code rate as c(m).

19. The operating method of claim 11, further comprising:
estimating a channel to a transmitting end using a receive signal; and
constituting an effective channel matrix by taking into account a signal processing on transmit symbol vectors in the transmitting end and a signal processing on receive symbol vectors in the receiving end.

20. The operating method of claim 11, further comprising:
feeding information of the final effective signal to noise ratio per stream or information of the modulation scheme combination corresponding to the final effective signal to noise ratio per stream, back to a transmitting end.

* * * * *